J. H. Barnes,
Toy.
No. 78,567.   Patented June 2, 1868.
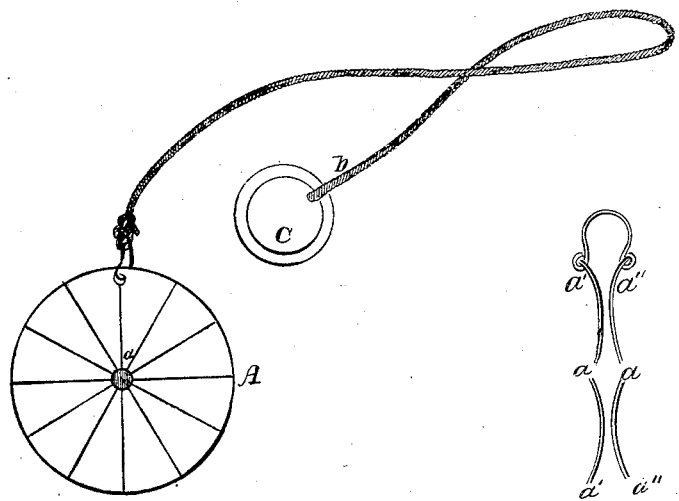
Fig. 1,    Fig. 2,
Fig. 3,
Witnesses
Edwin James
John D. Bloor
Inventor
J. H. Barnes
per Holmead & Hollingshead
Attorneys

United States Patent Office.

JOHN H. BARNES, OF TROY, NEW YORK.

Letters Patent No. 78,567, dated June 2, 1868.

TOY.

The Schedule referred to in these Letters Patent and making part of the same.

TO ALL WHOM IT MAY CONCERN:

Be it known that I, JOHN H. BARNES, of Troy, county of Rensselaer, and State of New York, have invented certain new Improvements in Toys; and I hereby declare that the following is a full, clear, and exact description of the same, reference being had to the accompanying drawing, and to the letters of reference marked thereon, making part of this specification, in which—

Figure 1 represents the toy, front view.

Figure 2 is a sectional view.

Figure 3 is an edge view.

The object of my invention is to combine in the ordinary box-whistle, which is blown by the mouth, flared flanches and strong cord tied to a loop, so that, when the toy is whirled rapidly around, the wind, acting upon the flanches, will produce a fluttering noise, and, at the same time, the air passing through the holes, will give a shrill and continuous whistling.

To enable others skilled in the art to make and use my invention, I will now proceed to describe its construction and operation.

A is the whistle, $a$ the holes through it, $a'$ $a''$ the flanches, $b$ the cord, and $c$ the ring.

Having thus fully described my invention, what I claim therein as new, and desire to secure by Letters Patent of the United States, is—

The combination, in a toy-whistle, of the flanches $a'$ and $a''$ with a cord and ring fastened by a loop or equivalent, substantially as described, and for the purpose specified.

In testimony whereof, I have signed my name to this specification in the presence of two subscribing witnesses.

JOHN H. BARNES.

Witnesses:
C. RHODES,
EDWIN BROWNELL.